May 11, 1926.                                                                1,584,124
C. E. NORTH ET AL
PROCESS OF OBTAINING OIL AND CASEIN FROM CREAM
Original Filed Feb. 19, 1924
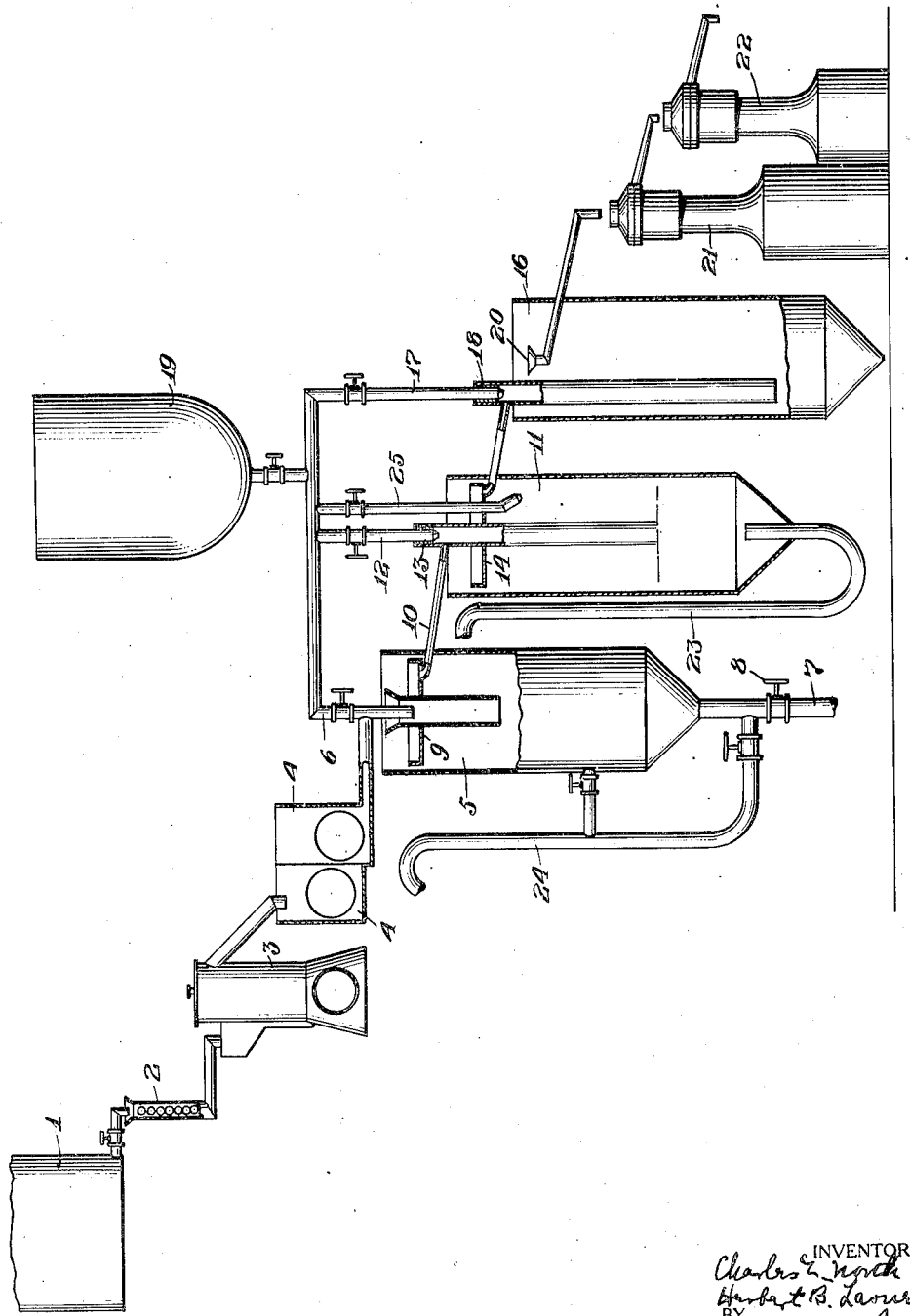
INVENTOR
ATTORNEY Patented May 11, 1926.

1,584,124

UNITED STATES PATENT OFFICE.

CHARLES E. NORTH, OF MONTCLAIR, AND HERBERT B. LARNER, OF EAST ORANGE, NEW JERSEY, ASSIGNORS TO THE MILK OIL CORPORATION, OF WILMINGTON, DELAWARE, A CORPORATION OF DELAWARE.

PROCESS OF OBTAINING OIL AND CASEIN FROM CREAM.

Application filed February 19, 1924, Serial No. 693,772. Renewed October 6, 1925.

Milk and cream may be regarded as consisting of three component elements: fat, water, and solids not fat, including casein. In sweet milk and cream having an acidity below .2%, the fat is in emulsion, the casein in solution or colloidal suspension, while the sugar, albumen and salts are in solution in the water. Should the milk or cream have an acidity above .2% the fat is still in emulsion, but the casein is thrown out of colloidal suspension by coagulation with acid while the other or non-fat solids remain in solution. The degree of acidity determines the extent of the coagulation of the casein, the higher the acidity the greater the curdling.

In any process for separating these three component elements so that the fat and the solids not fat may be recovered, the fat in a pure and both fat and the solids not fat in an anhydrous condition, many difficulties are met with which must be overcome before the process can be regarded as practical and commercial. The chief of these difficulties reside in the breaking of the emulsion, the cleaning of the fat of solids not fat, the separation and recovery of the curds or solids not fat, the dehydration of the fat and the curds, and the adjustment of the steps to each other so as to render the process practical, continuous and automatic under commercial conditions. At the present time, mainly as the result of discoveries disclosed in patents and applications of Charles E. North and his associates, and now in practical use, most of these difficulties have been overcome, but many problems still remain unsolved, and the process, subject of this application for Letters Patent, is concerned with the solution of one of these.

A large industry has been developed in recent years in the manufacture of butter from cream furnished by dairy farmers. In this case butter factories are located in regions where transportation facilities are limited and inadequate, so that the farmers skim their milk and bring the cream to the centralizers less frequently than fresh milk is usually brought in. As a result the cream is generally sour. Under ordinary conditions this cream has a fat content varying from 30% to 50% and an acidity of from .3% to .9%, and it may be churned in its natural state, and generally is. At these stations, however, it is customary to add to the cream lime or some alkali to reduce the acidity below .2%, to then Pasteurize it, to then add lactic acid culture or artificial buttermilk "starter" whereby the cream is again soured to an acidity of about .4%, and this is churned to make butter. The buttermilk is separated from the butter and condensed or dried and sold as chicken feed, while the butter is very extensively sold and used, all over the country, and constitutes our main supply of commercial tub butter.

Both milk fat or oil and curds are recognized as products of high commercial value. The curd, aside from the intrinsic value of the casein, forms a very useful by-product of butter making for various purposes one of which is for a chicken feed, but having been recovered heretofore merely as a by-product, its recovery has entailed a very material loss. The present process is primarily designed to meet this condition, and to separate out from sour cream not only all the butter fat in a pure anhydrous condition in which it may be used for making high grade butter or for other purposes, but also all of the curd or casein. In the specification which follows the description will, therefore, be confined mainly to the treatment of such sour cream, although there are certain steps or features of the process, as will be pointed out, which lend themselves with great advantage to the treatment of sweet milk.

In all processes heretofore practiced for the extraction of a pure fat from milk and cream, there are material losses of fat and even greater losses of skim-milk and casein. For example, in such processes as involve dilution of the cream with warm water and its subsequent passage through a centrifuge to wash the fat or remove the excess of water, there is a marked loss of fat in the dilution water and this, under the most approved conditions, may amount to .012%. Again in the initial centrifugal separation of the cream all of the skim-milk separated out is available for commercial purposes, but the cream with its 40% of fat and its 60% of skim-milk is not treated with any view to the recovery or utilization of this skim-milk, and the fat content is alone regarded as of any value. The difficulties of removing the last vestige of skim milk from the fat are so serious that its conservation is looked upon as a purely secondary consideration, and it is invariably destroyed or lost. This loss may be very serious as may be seen from the consideration that assuming a milk factory to receive 500 cans of milk daily containing 4% butter fat, it will yield by centrifugal separation 50 cans of cream containing 40% fat and 60% skim milk, from which 20 cans of pure fat may be secured with a loss of 30 cans of skim.

In the case of sour cream a special problem is presented in the extraction of a pure fat because the curdled casein clings so tenaciously to each fat globule, but in all practicable processes heretofore followed the curds of the sour cream are either destroyed or impaired or lost. If the cream be churned into butter, the buttermilk is now recovered and sold in condensed form as chicken feed, but all that clings to the butter is wholly lost for any such purpose. The recovery of all skim milk with its curds becomes therefore a most important branch of the milk industry.

In the practical development of our present process, as applied more particularly to sour cream, we have discovered certain facts which contribute very materially to its success and the nature of the results accomplished. For example we have ascertained the heretofore unrecognized fact that for the best results in the recovery of both the fat and the curd, the cream subjected to treatment should have a certain and definite acidity; that it should have a certain and definite fat content, and that the primary separation and subsequent purification of the fat or oil in a pure state should be conducted with a very much smaller volume of water in the sedimentation and wash tanks than was heretofore thought possible. We shall therefore give as the standards those figures which in practice we have found to produce the best results, and these we claim, but it will be understood that our results are approximated closely in proportion to the approach to these standards and that departure from them produces not new results but involves merely an impairment of the process as a whole.

Our process may be described and defined as follows. Sour cream, as above stated, is used as the material to be treated. Such cream as a rule, when delivered to the butter factories, has usually a fat content above 40%, but we have discovered that this is too high for the best working of our process, as it is not possible to precipitate all casein and curds from such rich cream since some of the casein floats to the surface of the sedimentation tank with the fat. The best cream for the purpose, we have found, should not contain more than 35% fat, as this percentage or less permits of a more complete separation or precipitation of the curds. The cream is therefore diluted as a first step until it is reduced to a fat content of approximately 35%.

We have also discovered that the degree of acidity of the cream is another factor of vital importance, and that an acidity of not less than .55% is necessary to a curdling of the casein sufficiently heavy for complete precipitation. The separation of the curds floating in water, to the surface of which the melted fat rises, is a matter of extreme delicacy. Under practically all ordinary conditions the coagulated curd tends to rise to the top of any vessel containing the melted cream where it becomes entangled in the fat and it is a serious problem to effect the rising of all the fat to the surface and the precipitation of all the curd to the bottom at the same time without the use of an excess of water, but if the figures given above are observed, that is to say, a cream with not more than 35% fat content and an acidity of not less than .55%, then the subsequent steps are readily carried out. The proper degree of acidity is obtained in any well known way.

This cream is then cooled to a temperature between 55° F. and 60° F. and passed through the devices which we have shown in the accompanying drawing which is a diagrammatic illustration of the apparatus used and which will be now referred to.

The cream properly diluted and of the proper degree of acidity which can be readily adjusted in well known ways, flows by gravity from a supply tank 1 to a cooler 2, where the temperature is reduced to 55° F. From the cooler it runs into the whipper 3. This is a well known piece of apparatus containing two paddles revolving in opposite directions at a speed of over 500 revolutions per minute. The rate of flow of the cream through this device is so regulated that the time required to bring about the proper agglomeration of the fat globules up to the breaking point of the emulsion is from 30 seconds to 2 minutes.

From the whipper the cream passes by gravity to a heater 4, which contains rotating disks or paddles, and here it is subjected to a temperature sufficient to melt the fat. In practice this temperature is 110° F., but temperatures as high as those used for Pasteurizing milk may be used and need only be operative for a period sufficient to effect complete melting of the fat.

The heated or melted whipped cream is run into a settling tank 5, where it is mixed with sufficient warm water through a pipe 6 to produce a mixture having a fat content of not more than 20%. It is important that the original cream with 35% fat should be whipped and then treated before being reduced to a mixture with 20% fat, as in this way the whipping is effected and the solid character and size of the curds very much improved.

Extended experimental investigations have demonstrated to us that this reduction of the fat pecentage to approximately 20% is vital to success and there seems to be a critical point at this figure at which a complete separation of the fat from the casein or solids not fat takes place.

The moment the mixture enters tank 5 the oil begins to rise to the surface and the casein or curd is precipitated to the bottom. The bottom of the tank is conical and has an outlet 7, controlled by a cock 8, by means of which the casein which accumulates may be periodically drawn off and dried out in any proper way as by the use of a condensed milk pan and heat.

In the meantime the oil with some of the milk serum rises into the skimming pan 9 from which it overflows through a pipe 10 and passes, by gravity, into and well below the surface of a wash tank 11. When necessary to refresh the water in tank 11 on account of concentration of fat and material washed from fat such refreshment can be made by the injection of any quantity of fresh warm water desired through nozzle 13 in pipe 12.

In this tank the oil with the excess of water introduced therein rises to the skim pan 14 and overflows through a pipe 15 by gravity into a second wash tank 16 and to a point therein well below the surface. Refreshment of water in tank 16 may also be made when needed through nozzle 18 in pipe 17 from hot water supply tank 19.

In wash tank 16 the oil rises immediately to the surface, and together with any excess of wash water flows down a funnel 20 to a whey separator, or what is now commercially known as an oil concentrator 21 through which it passes and by which it is freed of all but about 2% of its moisture. From this device it flows into an oil dehydrator 22 by means of which the oil is deprived of its last traceable vestige of moisture and from which a pure anhydrous oil flows.

If the above described precautions are carefully observed, the separation of the curds from the oil and water is almost perfectly and in a few minutes effected in the settling tank 5. If any solids not fat pass off with the oil from this tank they are so small in amount as to be negligible, and the recovery of the curds may therefore be regarded as complete. This process, therefore, presents great advantages over the more usual methods of recovering the curds. For example under the more usual practice the cream is churned to make butter, and the buttermilk is then evaporated to recover the curds. But about 18% of the total quantity of curd has been taken up by the butter, and this, so far as the curds are concerned, is a dead loss.

Another great advantage which this process possesses is in the very greatly reduced amount of wash water required. For example in the process as heretofore practiced the cream is diluted perhaps three times with ten volumes of wash water, thus requiring at least 30 volumes of water to one of cream, with a resultant loss of much of the fat which passes off with the waste wash water, whereas in this process not more than a total of 2 volumes of water to 1 of the cream is employed, so that this mixture may be passed at once through the whey separator which recovers practically all of the fat.

Another factor of the greatest importance in any process for the extraction of fat from milk and cream is the preservation of the natural flavors of the fat. Of the nine glycerides of different fat included in the composition of milk fat five are volatile and more or less soluble in hot water. These are butyrin, caproin, caprylin, caprin, and laurin, which constitute from 8% to 17% of milk fat, and because of their volatility, are largely responsible for the odor and flavor of milk and butter.

In any process for fat extraction the use of hot water involves the risk of washing away some of these volatile glycerides of fat. For example, if milk fat is melted and successive heavy dilutions of hot water are used and the fat separated from the water by a centrifuge, the washed fat will be observed to have a flat taste and to have lost its natural flavor. This is due to the washing away of flavoring glycerides by the hot dilution water.

In all processes previously proposed, quantities of hot dilution water are used resulting in this loss of flavor, but in none is disclosed the process herein described for the first time, a complete remedy for such flavor losses while at the same time all the physical advantages of fat separation by dilution with hot water are preserved. In the apparatus herein described the tanks are very small in size compared with the total volume of cream or milk from which fat is to be extracted. In deciding upon the size of such tanks for the purpose the volume of milk or cream to be handled per day at the factory or shipping station is the basis. For example, if 40,000 lbs. of milk are received or the equivalent 4,000 lbs. of cream and the factory is to be operated 10 hours per day, the rate of handling must be 400 lbs. of cream per hour. If the period required for fat to rise from the point where it is introduced into a tank to the point where it flows out, is one minute, then the space required for this step in the process must be one-sixtieth of the hourly volume or 6⅔ pounds. To allow room for the separation of casein from fat by the presence of a stationary volume of water we have found in practice that a space equal to a volume flow of 5 minutes is satisfactory, which means one-twelfth of the hourly run, or in the example quoted it would means 1/12 of 400 lbs. or 33⅓ lbs. One 40 quart can of cream weighs 84½ lbs. therefore a space for 33⅓ lbs. means only 15 quarts. In short, the size of the three settling tanks shown in the drawing would have to be only 15 quarts each to accommodate a flow of cream for fat separation of 400 lbs. per hour or 4,000 lbs. per day. Since the first tank is not a wash tank but is regulated to hold a sour cream of 20% fat and a sweet cream of 35% fat we have to consider only the water in wash tanks 11 and 16, and these together hold 66⅔ pounds, or ⅙th of the hourly run of cream and 1/60th of the daily run. The quantity of fat extracted is 35% of the 4,000 lbs. of cream or 1,400 lbs. Therefore in starting the process for 1,400 lbs. of fat the amount of water in both tanks should be 66⅔ pounds or only 1/21st of the quantity of fat.

The preservation of the flavor of the fat is accomplished by keeping the concentration of fat in the water in the tanks at the saturation point. The primary purpose of the water is as a vehicle or buoy on which the fat can float upward and separate itself from the casein. The fact that water has a specific gravity between that of fat and casein makes the presence of water a physical vehicle for the passage of the fat upward and the casein downward, a function of the water which is entirely distinct from its washing properties. For separation of fat from casein only enough water is necessary to ensure a space between the fat layer which collects at the top and any casein deposit which may accumulate at the bottom.

The small quantity of water in the tanks is less than 5% of the total fat volume, less than half of the hourly run of fat and less than six times the quantity of fat present at any one moment. This small quantity of water quickly becomes saturated with all of the volatile glycerides it can dissolve. Practically complete separation of fat from casein and solids not fat takes place in the first tank, and in the second tank there is practically no deposit of casein. While the water in the second tank becomes in a few moments after a run starts, opalescent, no refreshment of water is necessary so long as the fat delivered by the dehydrators is clear. The apparatus can be operated for an hour or more without refreshment of the tank water.

By keeping the temperature of the water as low as possible the dissolving of the glycerides is kept at a minimum. While soluble in hot water (about 145° F.) they are only slightly soluble in water below 110° F. and this process can be successfully operated between 105° F. and 110° F.

The small size of the tanks, the small quantity of water and the low temperature make possible the conservation of all of the fats so that flavors are not lost, an accomplishment not yet achieved by any process heretofore invented.

Again this process is perfectly continuous. All of the apparatus used is capable of exact adjustment and its operation is automatic. The washing of the fat or oil is much more perfectly and readily accomplished and there are practically no losses. The contents of the settling tank, for example, at the end of a run may be drawn off after the curds are removed and run through a whey separator. We also use a wash water overflow 23 from the first wash tank which takes off any excess of such water, and this may also be passed through a suitable centrifuge to recover any oil which it may contain. The water in the last wash tank is so free of oil, which all rises to the surface, that no special provision need be made for treating it after a sufficient amount has been run off through the oil outlet with the oil.

As we have indicated above, parts of this process are directly and advantageously applicable to the recovery of oil and casein from sweet cream. For example, as pointed out, the casein in sweet cream is not coagulated but in solution or colloidal suspension. It may not, therefore, be recovered by precipitation as is the case with sour cream. If, therefore, sweet cream be treated, the same apparatus may be used but with slight modifications. For example there is an overflow for the skim milk 24 from the settling or sedimentation tank, and this is open at all times so that this skim milk with its contained casein in solution or colloidal suspension runs off and may be dried and made into milk powder or into condensed skim milk. The oil which rises to the surface of the tank is run off and washed by the apparatus without substantial change.

In the treatment of either sweet or sour cream it may be found desirable to introduce a part of the wash water into the first wash tank 11, near the top of the same and into the body of rising oil. For this purpose a valve controlled pipe 25 connected with the warm wash water supply extends down to a point somewhat below the skim pan, as indicated.

As may be observed from the above, the cream in the process, whether sweet or sour, is brought into much more intimate contact with the wash water and far more thoroughly and effectively cleaned of all foreign matter. Again the recovery of fat from a given body of cream is much more complete than is possible by the processes heretofore in use, for in this case the only loss of fat that can occur is in the water discharged from the dehydrating centrifuge. This is so small as to be negligible.

This process is most efficient in respect to the conservation of wash water, for whereas in previous processes many times the volume of cream in wash water was required, in this not more than two volumes of water to one of cream are used.

What we claim is:

1. The process herein set forth of recovering the oil and the casein or curds from sour cream, which consists in cooling the cream, whipping it, heating the whipped cream to a temperature sufficient to melt the fat and coagulate the curds, adding to the melted cream sufficient water to form a mixture with a fat content of not more than 20%, permitting this mixture to stand in a settling tank until the oil rises to the surface and the curds are precipitated to the bottom.

2. The process herein set forth of recovering the oil and the curds from sour cream as separate products, which consists in cooling and whipping cream of a proper acidity, heating the whipped cream until the fat is melted and the casein coagulated, adding thereto warm water sufficient in amount to form a mixture having a fat content not over 20%, allowing the mixture to stand in a settling tank until the oil rises to the surface and the coagulated casein is precipitated to the bottom, drawing off the oil from the top and the casein from the bottom of said tank, and cleaning and drying the oil and drying the casein.

3. The process herein set forth of recovering the oil and the casein from sour cream as separate products, which consists in cooling and then whipping cream having an acidity of at least .55%, heating the whipped cream until the fat is melted and the casein coagulated, adding thereto warm water sufficient in amount to form a mixture having a fat content of 20%, allowing that mixture to stand in a settling tank until the oil rises to the surface and the coagulated casein is precipitated to the bottom, and collecting and drying the oil and the casein.

4. The process herein set forth of recovering the oil and the casein from sour cream as separate products, which consists in cooling cream having a fat content not exceeding 35%, whipping and melting the whipped cream, adding thereto sufficient water to reduce the fat content of the mixture to about 20%, and allowing this mixture to stand in a settling tank until the oil rises to the surface and the casein is precipitated to the bottom of the same.

5. The process herein set forth of recovering the oil and the casein from sour cream as separate products, which consists in cooling cream having a fat content of not exceeding 35% and an acidity of not less than .55%, whipping such cream, melting the whipped cream, adding sufficient water to reduce the fat content of the mixture to 20%, and allowing the mixture to stand in a settling tank until the oil rises to the surface and the coagulated casein is precipitated to the bottom of the same.

6. The process herein set forth of recovering the oil and the casein from sour cream as separate products, which consists in cooling and whipping cream of the proper acidity and fat content, heating the whipped cream, adding thereto the proper quantity of water, allowing the mixture to stand in a settling tank until the oil rises to the surface and the coagulated casein is precipitated to the bottom of the same, drawing off the supernatant oil and passing it down into and through a succession of wash tanks to which fresh wash water is continuously delivered in an amount not exceeding twice the volume of the cream, and dehydrating the overflowing oil and water from the last tank of the series.

7. The process herein set forth of recovering the oil and the casein from sour cream as separate products, which consists in cooling and whipping cream of the proper acidity and fat content, heating the whipped cream, adding thereto the proper quantity of water, allowing the mixture to stand in a settling tank until the oil rises to the surface and the coagulated casein is precipitated to the bottom of the same, drawing off the supernatant oil and carrying it through a succession of wash tanks into which it is delivered below the surface of the water therein so that it rises to the top, and supplying to such wash tanks when necessary fresh water in limited amount not exceeding that which keeps the concentration of the volatile fats at the saturation point and dehydrating the overflowing oil and water from the last tank in the series.

8. The process herein set forth of recovering the oil and the casein from sour cream as separate products, which consists in cooling and whipping cream of the proper acidity and fat content, heating the whipped cream, adding thereto the proper amount of water, allowing the mixture to stand in a settling tank until the oil rises to the surface and the coagulated casein is precipitated to the bottom, drawing off the supernatant oil and forcing it by the injector action on the same of water jets into and below the surface of water in a succession of wash tanks, fresh water being added in an amount not exceeding that which keeps the concentration of the volatile fats at the saturation point and thereby purifying the oil.

9. In the process herein described, the step or steps involved in the cleaning of the supernatant oil produced by melting whipped cream, heating the same and allowing the heated cream to stand with water in a settling tank, which consists in passing said oil through a succession of wash tanks to which is added fresh wash water in an amount not in excess of that which keeps the concentration of the volatile fats at the saturation point.

10. In the process herein set forth, the step or steps involved in the cleaning of the supernatant oil from a settling tank, which consists in forcing said oil into a succession of wash tanks to a point below the surface of the water in the same, and adding to such tanks fresh wash water in amount not to exceed that which keeps the concentration of the volatile fats at the saturation point.

11. In the process herein set forth, the step or steps involved in the cleaning or purification of the oil obtained from a mixture of water, milk serum and oil, which consist in passing said oil into and through a succession of wash tanks so that it rises from its point of entrance below the surface to the top of the water contained therein, and supplying to said tanks fresh wash water in amount not exceeding that which keeps the concentration of the volatile fats at the saturation point.

12. The process herein set forth of obtaining the oil and casein from sour cream as separate products, which consists in permitting the cream after being whipped to stand in a settling tank containing sufficient water to make a mixture having a 20% fat content, and maintaining the temperature in the tank at a point sufficient to melt the fat and coagulate the casein whereby the oil will rise to the surface and the coagulated casein will be precipitated.

13. In the process herein set forth, the step or steps involved in the washing of the oil which consist in passing the melted fat of the cream through a succession of wash tanks to which fresh wash water is added continuously in such limited amount as to permit the overflowing oil and waste wash water to be economically subjected to the action of centrifugal dehydrators to separate the water from the oil.

14. In the process herein set forth, subjecting the cream to such treatment as to break the emulsion and coagulate the casein, allowing the oil and casein to stand in a settling tank with the proper amount of water to precipitate the casein, and drawing off from the bottom of said tank the accumulated casein.

15. The process herein set forth of recovering the oil and casein from cream as separate products, which consists in cooling and whipping the cream, heating the whipped cream, adding thereto dilution water regulated as to amount and temperature so that it is sufficient to permit complete separation of fat from solids not fat, but at the same time not too warm to cause any appreciable loss of soluble volatile glycerides so that the natural flavors characteristic of milk fat are preserved.

In testimony whereof we hereto affix our signatures.

CHARLES E. NORTH.
HERBERT B. LARNER.